April 22, 1930.  C. M. HANNAFORD  1,755,874
LOCK FOR CONNECTING PINS OR BOLTS
Filed March 5, 1927
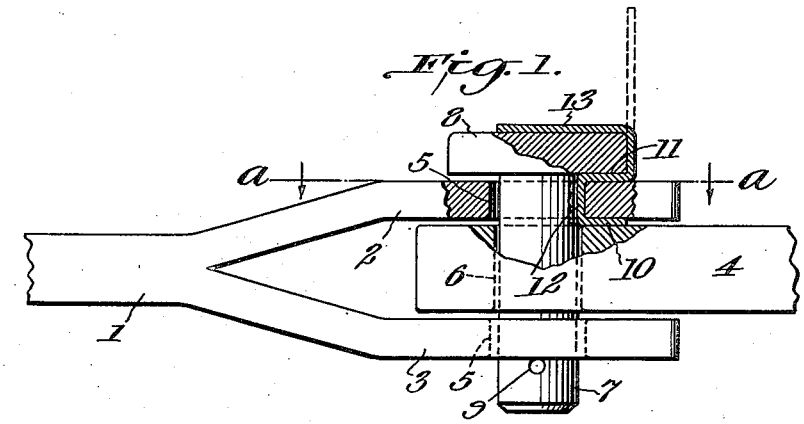
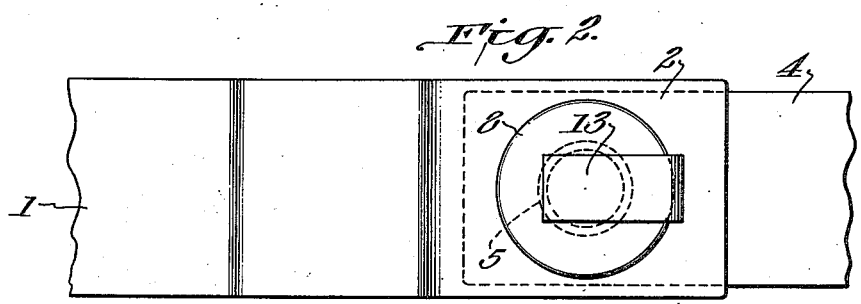
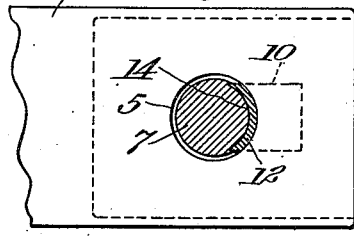
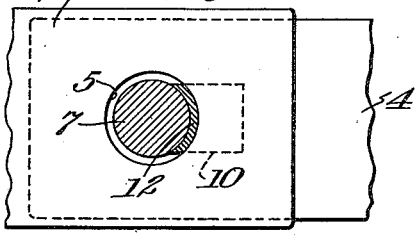
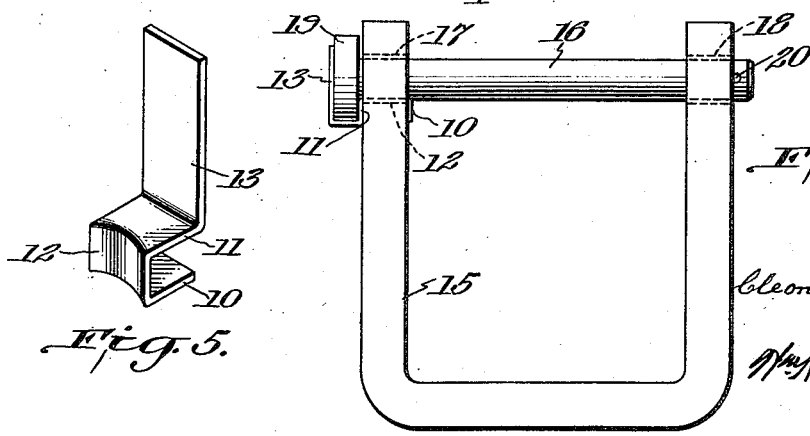
Inventor
Cleon M. Hannaford
by
Attorney Patented Apr. 22, 1930

1,755,874

UNITED STATES PATENT OFFICE

CLEON M. HANNAFORD, OF RICHMOND, VIRGINIA, ASSIGNOR TO CAR DEVICES COMPANY, INCORPORATED, OF RICHMOND, VIRGINIA, A CORPORATION OF VIRGINIA

LOCK FOR CONNECTING PINS OR BOLTS

Application filed March 5, 1927. Serial No. 173,070.

The object of this invention is to provide a lock as a substitute for or an addition to the cotter-pin commonly used to prevent the escape of pins or bolts, and particularly such pins or bolts as are used for connecting the forked or jawed brake-rod and brake-levers of railway car brake gearing or mechanism, although the invention is applicable for locking pins or bolts used in connection with other mechanism.

The invention consists of a lock, made of flexible metal, provided with a clamping portion adapted to engage in a pin-hole or bolthole of one of the members to be secured and having another member extending outside of the hole and adapted to be flexed or bent over the head of the pin or bolt so as to preclude the lengthwise movement of the pin or bolt; the clamping portion being curved, by preference, to conform to the adjacent contour of the pin or bolt or a recess made in the adjacent portion of the pin or bolt; the use of an additional lock, in the form of a cotter-pin, for example, being optional, as I will proceed now to explain and finally claim.

In the accompanying drawings illustrating the invention, in the several figures of which like parts are similarly designated, Figure 1 is a plan view, partly in section, showing the invention applied to the forked end of a brake-rod, in connection with the brake-lever. Fig. 2 is a side elevation. Figs. 3 and 4 are sectional views on line *a—a*, Fig. 1, showing the lock respectively applied to the surface of the shank of a pin or bolt and within a recess made in such shank. Fig. 5 is a perspective view of the lock. Fig. 6 is an elevation showing the lock applied to the pin or bolt of a brake-hanger.

1 is a portion of a brake-rod forked at one end to provide the jaws 2 and 3, between which is entered a brake-lever 4. The two jaws are provided with holes 5 and a complemental hole 6 is made in the brake-lever. The pin or bolt has its shank 7 passed transversely through these holes 5 and 6 to connect the two members, with its head 8 adjacent to one of the jaws and the cotter-pin hole 9 in the opposite end of the shank adjacent to the other jaw.

The lock, in the preferred construction, is shown more particularly in the detail perspective view, Fig. 5. It comprises the jaw-straddling clamp composed of an inner member 10 to engage the inner side of the jaw, an outer member 11 to overlie the outer side of the jaw and parallel to the member 10 and spaced apart from it substantially the thickness of the jaw, and these two members 10 and 11 connected by the member 12 which engages the edge of the hole 5 in the jaw and is of arcuate cross-section to conform to the arc of the circle of the hole in the jaw and the adjacent surface of the shank of the pin or bolt. The outer member 11 is continued upwardly at right angles to form the member 13 located so as to contact with the periphery of the head 8 of the pin or bolt and of sufficient length to be flexed or bent over the top of the said head from the upright position shown in Fig. 5 and the dotted position shown in Fig. 1, to the full line position shown in Fig. 1.

As shown in Fig. 3, the arcuate member 12 may engage the outer periphery of the shank of the bolt, or as shown in Fig. 4, the shank of the bolt may be recessed, as at 14, to receive a portion of the arcuate member to provide for the amount of clearance between the pin or bolt and the hole in the jaw.

The lock will be supplied as shown in Fig. 5, and in use its clamping members 10, 11, 12, will be entered in the hole in the jaw 2 and moved over into contact with the edge of the hole, as shown in Fig. 1, and then the pin or bolt will be inserted with its head resting upon the outer member 11 and against the lower part of the extension 13 and then this extension will be flexed or bent down from the dotted line position in Fig. 1 to the full line position, same figure, to rest upon the top of the head of the pin or bolt to thereby prevent endwise movement or escape of the pin or bolt.

As shown in Fig. 6, the invention is applicable to a brake-hanger 15, shown in conventional form, with two jaws, and with a pin or bolt 16 passed through holes 17 and 18 in the adjacent jaws or members of the hanger. The pin or bolt 16 has the head 19 on one end and the cotter-pin hole 20 through its other end. A lock, such as shown in Fig. 5, is shown in place in Fig. 6 as applied to the head of the pin or bolt and the adjacent jaw or member of the hanger in substantially the way shown in Fig. 1 and for the same purpose.

It will be noted that no holes are made in or through the lock for engagement with the pin or bolt, and that the lock is applied externally to both the shank and the head of the pin or bolt, thus providing a lock which lends itself to economical manufacture as well as speedy application. The lock can be set in place first, to hold the other parts in place while the pin or bolt is being inserted. As the parts are heavy, it is not easy to hold the parts in place in other constructions to receive the pin. The locks must be held in line with the pin or bolt holes in order to facilitate the application of the pin. These requirements are met in my construction, because the clamping members 10, 11 and 12 engage the holed part with sufficient tenacity. In my invention the lock is placed in operating position, and the pin started through the hole and the other parts lined up and the pin or bolt put in place without disturbing the lock.

While the invention is shown as applied to a brake-rod and lever joint and also to a hanger, it is to be understood that I do not restrict the use of my invention to these objects, as obviously it is capable of use wherever a pinned or bolted joint is used.

The invention is susceptible of variations in detail without departing from its principle and the scope of the claims following.

What I claim is:—

1. A lock for connecting pins or bolts, in a joint, the same comprising a clamping member adapted to fit in the pin-hole or bolt-hole in the joint and having an inner member to engage the inner side of the joint, an outer member to overlie the outer side of the joint and parallel to the inner member, and a connecting arcuate member to conform to the periphery of the pin or bolt, and an extension capable of engaging the periphery of the head of the pin or bolt and of being bent down over said head to prevent endwise escape of the pin or bolt.

2. A joint for movable members having alined holes therein, a pin or bolt engaging said holes and having a head at one end, the shank of the pin or bolt being recessed circumferentially and a lock having a clamping member to engage the inner and outer faces of one of the members of the joint and a connecting member of arcuate form engaging the recess in the shank of the pin or bolt, and provided with an extension adapted to be bent over the periphery and head of the pin or bolt.

3. A joint for movable members, one of which members is forked to receive the other member, the two members provided with holes, a headed pin arranged in the holes, and a locking device having a clamping end composed of parallel inner and outer members and an arcuate connection of these two members normal thereto, said clamping member adapted to be inserted in one of the holes of the members to be connected and in superficial engagement only with the headed pin and having an extension beyond the outer member to engage the periphery of the head of the pin or bolt and also to be bent down over the top of said head.

In testimony whereof I have hereunto set my hand this 4th day of March, A. D. 1927.

CLEON M. HANNAFORD.